(12) United States Patent
Henblad et al.

(10) Patent No.: US 9,090,230 B2
(45) Date of Patent: Jul. 28, 2015

(54) METHOD FOR ALIGNMENT OF A VEHICLE AND LEVELLING BENCH ARRANGEMENT

(75) Inventors: Peter Henblad, Skogstorp (SE); Michael Kleis, Meissenheim (DE); Joel Bäckman, Eskilstuna (SE); Sivert Stenkvist, Torshälla (SE)

(73) Assignee: Car-O-Liner AB, Kungsör (SE)

( * ) Notice: Subject to any disclaimer, the term of this patent is extended or adjusted under 35 U.S.C. 154(b) by 2339 days.

(21) Appl. No.: 11/900,001

(22) Filed: Sep. 6, 2007

(65) Prior Publication Data

US 2008/0087201 A1 Apr. 17, 2008

(30) Foreign Application Priority Data

Sep. 7, 2006 (SE) ...................................... 0601847

(51) Int. Cl.
*B60S 5/00* (2006.01)
*B21D 1/14* (2006.01)
*G01B 5/25* (2006.01)
*G01C 9/02* (2006.01)

(52) U.S. Cl.
CPC ... *B60S 5/00* (2013.01); *B21D 1/14* (2013.01); *G01B 5/25* (2013.01); *G01C 9/02* (2013.01)

(58) Field of Classification Search
CPC ............ B21D 1/12; B21D 1/04; B21D 1/145; B60S 5/00; B25H 1/0007; Y10S 72/705
USPC ........ 72/31.01, 31.02, 457, 705, 447; 33/608, 33/645, 288; 248/352, 357
See application file for complete search history.

(56) References Cited

U.S. PATENT DOCUMENTS

| | | | |
|---|---|---|---|
| 4,055,061 A * | 10/1977 | Bayorgeon et al. | 72/31.02 |
| 4,242,803 A | 1/1981 | Dory | |
| 4,761,984 A | 8/1988 | Fuscaldo, Jr. | |
| 4,781,045 A | 11/1988 | Celette | |
| 4,986,107 A | 1/1991 | Peyret | |

(Continued)

FOREIGN PATENT DOCUMENTS

| | | |
|---|---|---|
| CN | 2129184 Y | 4/1993 |
| EP | 0419383 | 3/1991 |
| FR | 2590014 | 9/1985 |

(Continued)

OTHER PUBLICATIONS

Celette Product Information Sheet (s), labeled 2005.900 & 2005.9.9, Copyright 2003.

*Primary Examiner* — Debra Sullivan
(74) *Attorney, Agent, or Firm* — Perkins Coie LLP

(57) ABSTRACT

A method for alignment of a vehicle and a levelling bench arrangement in relation to one another is disclosed, wherein the levelling bench arrangement comprises a levelling bench (1), a support structure (3), a plurality of beams (5), and a plurality of fixture devices (7). According to the method the support structure is arranged on the levelling bench, at least some of the beams are locked to the support structure, at least some of the fixture devices are releasably mounted at the beams, a vehicle, which is to be repaired or inspected, is arranged above the levelling bench, the mounted fixture devices are aligned with respect to the vehicle by means of continuously moving the beams and the support structure in a horizontal plane so that the fixture devices will define certain specific reference points of the vehicle and the beams are releasably fastened to the levelling bench.

13 Claims, 4 Drawing Sheets

(56) References Cited

U.S. PATENT DOCUMENTS 5,131,257 A 7/1992 Mingardi
5,357,777 A 10/1994 Castellano

FOREIGN PATENT DOCUMENTS

GB 2098522 11/1982
GB 2135626 9/1984

* cited by examiner

METHOD FOR ALIGNMENT OF A VEHICLE AND LEVELLING BENCH ARRANGEMENT

TECHNICAL FIELD

The present invention relates generally to alignment and inspection of vehicles and their parts, for instance vehicle bodies, which have been damaged at traffic accidents. The invention relates particularly to a method for alignment of a vehicle and to a levelling bench arrangement.

PRIOR ART

U.S. Pat. No. 4,781,045 discloses a vehicle repair system for locating and defining predetermined points of the parts of a vehicle in order to ensure coincidence with vehicle specifications. The system uses a common base part comprising columns, at which exchangeable heads are releasably mountable, in order to make it possible to use the base part of the system in order to inspect and verify the position of different vehicle parts for each of a large number of vehicle models. Each of the exchangeable heads is specifically configured for use with a particular vehicle model and for localizing a part of a vehicle of the particular vehicle model.

In order to inspect and verify the position of different vehicle parts of a vehicle, the vehicle is attached to a levelling bench by means of several support or holding devices, which are mounted at a longitudinal beam of the levelling bench. In order to secure a correct positioning of the heads, the vehicle has to be aligned in relation to the heads or the columns, at which the heads are releasably mounted, before the repair work can be started.

SUMMARY OF THE INVENTION

One of the problems with the known art is that it is relatively difficult to align the vehicle in relation to the heads/columns. Either the vehicle has to be fine adjusted in relation to the levelling bench or the levelling bench has to be fine adjusted in relation to the vehicle. In both cases fine adjustment of a very heavy device is required.

An object of the present invention is therefore to provide a method for alignment of a vehicle and a levelling bench arrangement in relation to one another, which is easier, faster and less costly in comparison to such alignment methods according to the prior art.

It is a further object of the invention to provide a levelling bench arrangement, by which it is possible to perform an alignment method, which fulfils the above given object.

These objects, among others, are attained by methods and levelling bench arrangements in accordance with the appended patent claims.

According to one aspect of the invention a method for alignment of a vehicle and a levelling bench arrangement in relation to one other is provided, wherein the levelling bench arrangement comprises a levelling bench, an elongated support structure, a plurality of beams, and a plurality of fixture devices. According to the method the support structure is arranged on top of the levelling bench, the beams are locked to the support structure at least in a horizontal plane, the fixture devices are releasably or removably mounted at the beams, a vehicle which is to be repaired or inspected, is arranged in a position above the levelling bench, the fixture devices are aligned with respect to the vehicle by means of continuously or steplessly moving the beams and the support structure as a single unit in the horizontal plane so that the fixture devices will define certain specific reference points of the vehicle and at least some of the beams or the elongated support structure are/is releasably attached to the levelling bench, thereby locking the beams and the support structure to the levelling bench in an aligned position.

According to a second aspect of the invention a method for alignment of a vehicle and a levelling bench arrangement in relation to one another is provided, wherein the levelling bench arrangement comprises a levelling bench, a support structure, and a plurality of fixture devices. The method comprises that the support structure is arranged on top of the levelling bench, the fixture devices are releasably mounted at the support structure, a vehicle, which is to be repaired or inspected, is arranged in a first position above the levelling bench, the fixture devices are aligned with respect to the vehicle by means of continuously moving the support structure with the fixture devices mounted in a horizontal plane so that the fixture devices will define certain specific reference points of the vehicle, and the support structure is releasably attached to the levelling bench, thereby locking the support structure to the levelling bench in an aligned position.

According to further aspects of the invention levelling bench arrangements are provided in order to make implementation of the alignment methods according to the first and second aspects of the invention possible.

An advantage of the invention is that complicated, time consuming and expensive alignment of vehicle and a levelling bench arrangement in relation to one another, which is the case by the known art, is entirely avoided. Neither a heavy vehicle nor a relatively heavy levelling bench is required to be moved, but only a considerably lighter arrangement comprising a support structure, a few beams and some fixture devices are moved during the alignment procedure.

SHORT DESCRIPTION OF THE DRAWINGS

The invention will be further disclosed below with reference to FIGS. 1-7, which are solely given to illustrate the invention and shall therefore in no way limit the same.

Figure 3:
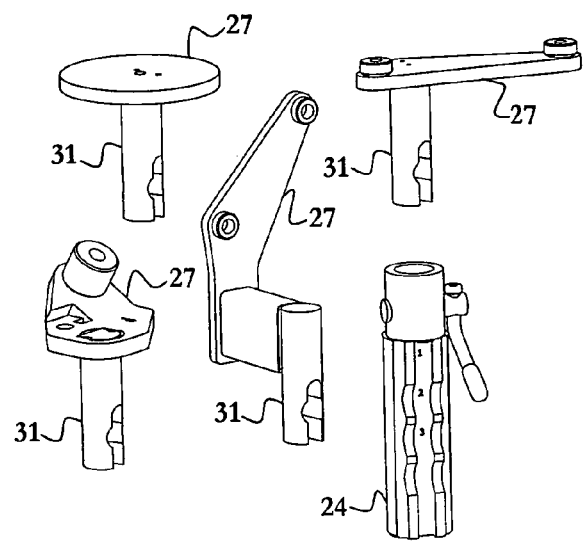
FIG. 3 shows in perspective views an adapter and several different heads intended to be used with the levelling bench of FIG. 1.
Figures 4A, 4B:
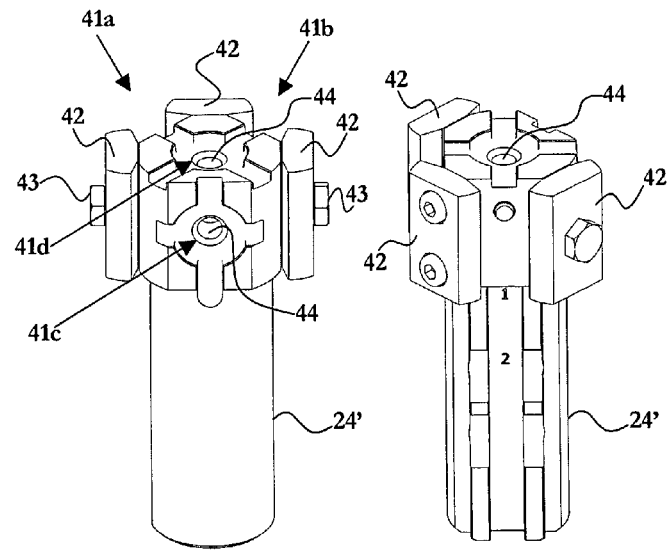

FIGS. 4a-b show in perspective views an alternative embodiment of adapters intended to be used with the column of FIG. 3.

Figure 1:
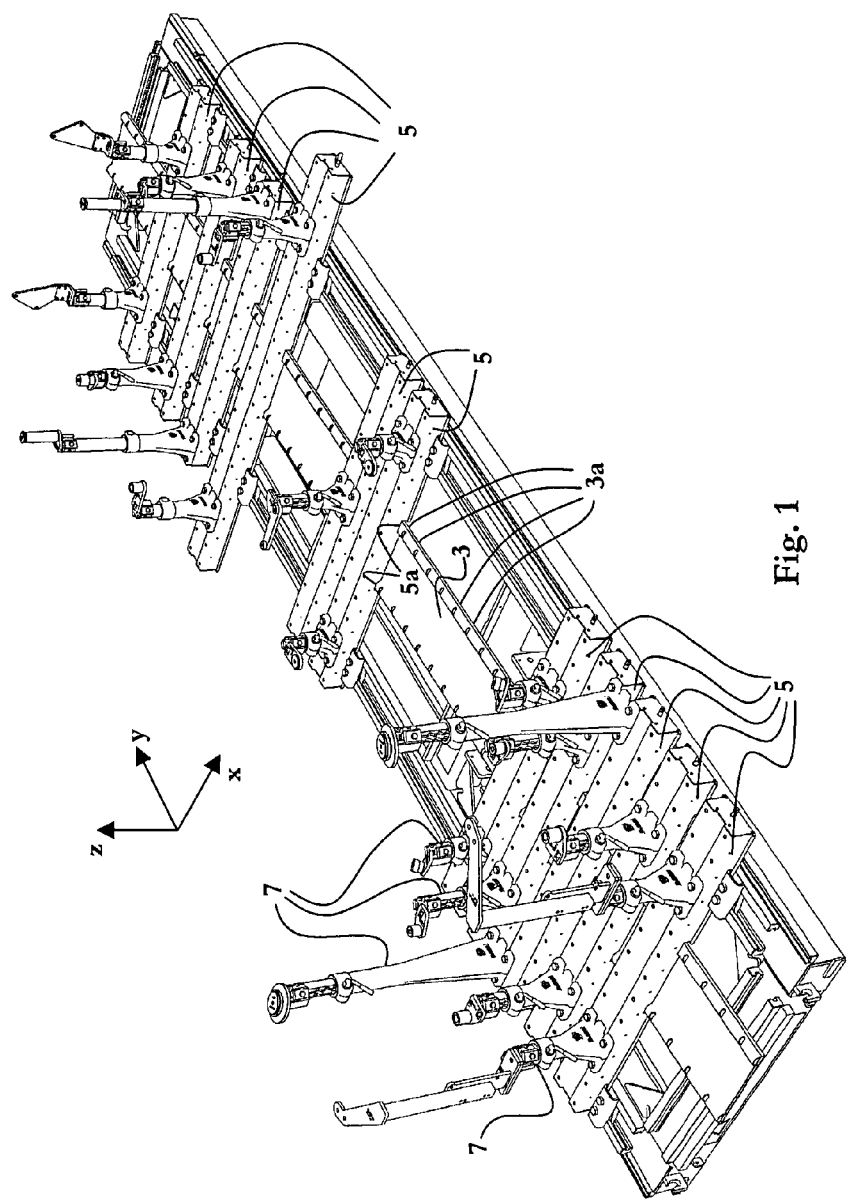
FIG. 1 shows in a perspective view a levelling bench arrangement in accordance with the present invention.
Figure 5:
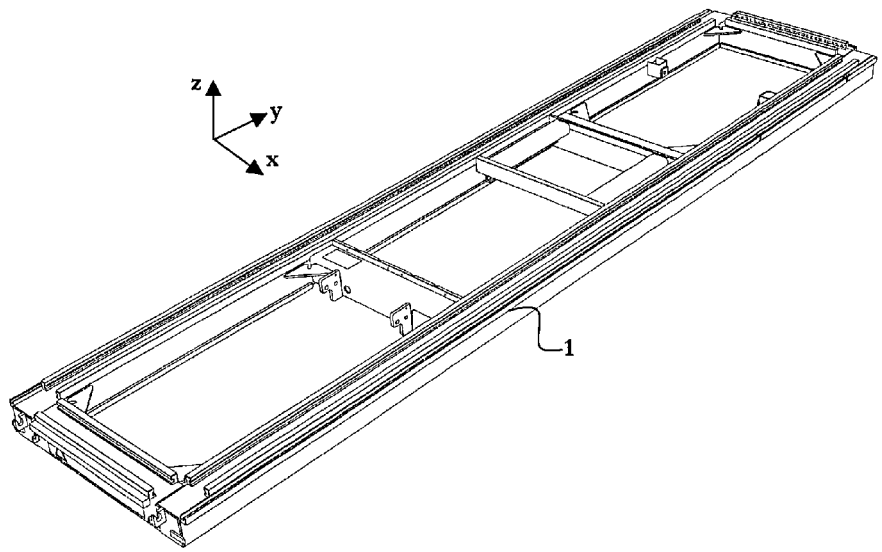
Figure 6:
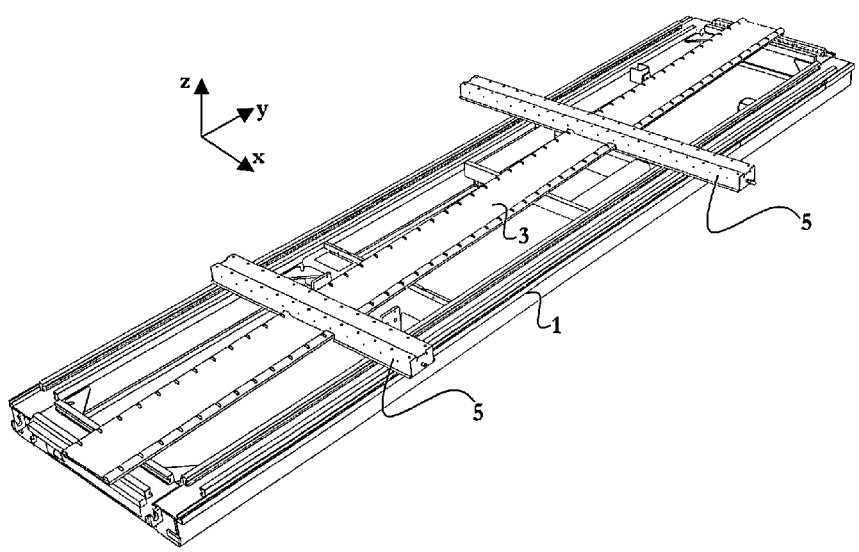
Figure 7:
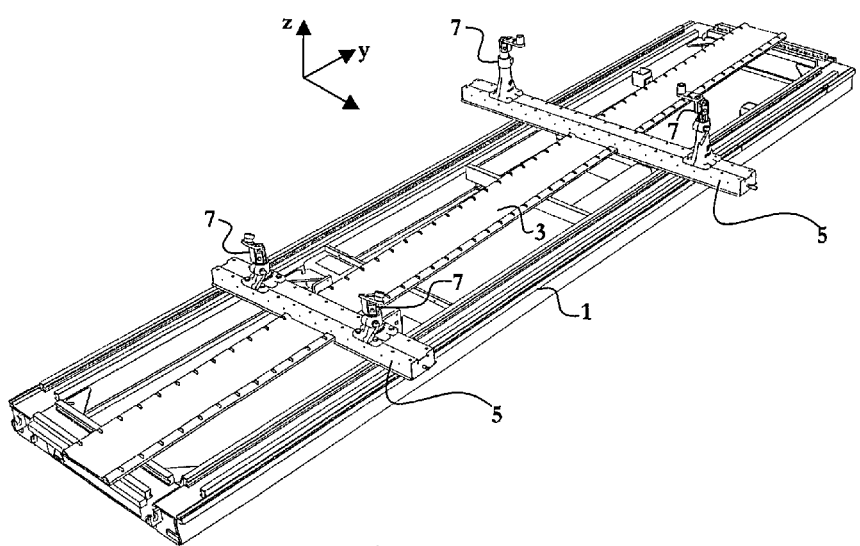

FIGS. 5-7 show in perspective views the levelling bench arrangement of FIG. 1 at different stages of a method for alignment of columns, adapters, and heads in relation to a vehicle.

DETAILED DESCRIPTION OF EMBODIMENTS

A levelling bench arrangement, which is shown in FIG. 1, comprises a levelling bench 1, an elongated support structure 3, several beams 5, and a plurality of fixture devices 7.

The levelling bench 1 is arranged on top of a scissor lift or another lifting device, which is used partly as a support for the levelling bench, partly for lifting the vehicle, which is to be repaired.

The elongated support structure comprises a plurality of slots 3a or similar, which can be brought into engagement with taps 5a or similar of the beams so that the beams 5 can be locked to the elongated support structure 3 in the horizontal plane (xy-plane) simply by placing the beams 5 on the elongated support structure 3 perpendicular (x-direction) to the extension (y-direction) of the support structure, thereby bringing the taps 5a of the beams into engagement with slots 3a of the elongated support structure 3. The beams 5 are released simply by lifting them out of the slots 3a of the elongated support structure 3. Other means for releasable attachment or locking can certainly be used instead. Further, these beams 5 may comprise locking devices for locking them also to the elongated support structure 3 in the vertical direction (z-direction).

The elongated support structure is illustrated as a plate. It may of course be exchanged for another detail having different structure, for instance a frame structure having slots, grooves or similar, which fulfils a similar function.

The slots 3a are preferably arranged with a desirable pitch in the direction of the extension of the elongated support structure. Hereby, the supports are capable of being locked to the elongated support structure at a finite number of selectable fixed positions.

The beams 5 are releasably attachable to the levelling bench 1 by means of screws or bolts, clamping means, or similar (not explicitly illustrated). Further, each of the beams 5 comprises groups of four screw holes 23 arranged along the beams, which can be seen in FIG. 2, which shows one of the fixture devices 7 as mounted at one of the beams 5. A group of four screw holes 23 receives four screws 22 of the fixture device 7 while the fixture device 7 is mounted at the beam 5. The groups of four screw holes 23 are preferably arranged with a desirable pitch in the longitudinal direction of the beams. Hereby the fixture devices 7 are mountable along the beams 5 at a finite number of selectable fixed positions.

Further, each group of four screw holes 23 may be arranged in the corners of an imaginary square so that each fixture device 7 can be releasably attachable to the beams 5 in four fixed rotational positions, which are mutually separated by 90 degrees.

Figure 2:
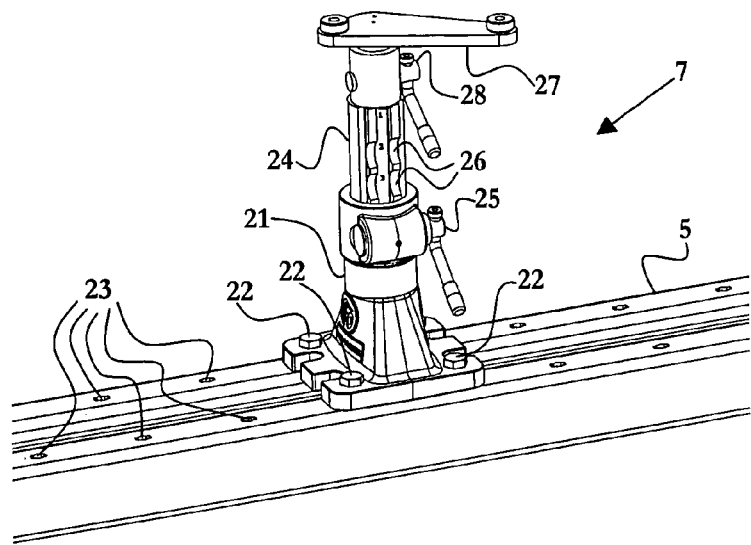
FIG. 2 shows in a perspective view a column, an adapter, and a head mounted at a cross bar in accordance with the invention.

Each fixture device 7 comprises according to one aspect of the invention a column 21, an adapter 24, and a head 27 as being illustrated in FIG. 2. Each column 21 comprises screws 22 and is releasably mountable to the beams 5. Further, each column comprises a bore, in which each adapter 24 can be inserted, and a locking mechanism 25 in order to lock the respective adapter 24 in a desired position. The bore of each column can be symmetrically or asymmetrically located with respect to the rotation of the column in the horizontal plane.

Each adapter 24 comprises a number of teeth 26, grooves, slots or similar (teeth, grooves, and slots are generically shown by reference 26) in its lower portion, which are inserted in a respective column 21 during mounting. Typically, the adapters can be inserted in the column in only one fixed rotational position. By means of bringing one of the teeth, grooves, slots or similar of each adapter 24 into engagement with a respective column, the adapter 24 can be stepwise moved upwards and downwards in the column 21 and be fastened at a desired position. Hereby, the adapters 24 are releasably mountable on the columns 21 at a finite number of selectable vertical positions in order to obtain mounted fixture devices of a finite number of selectable fixed heights.

Further, each adapter 24 comprises a recess, into which each head 27 can be inserted, and a locking mechanism 28 in order to lock respective head 27 in a desired position.

In FIG. 3 an adapter 24 and a number of different heads 27 are shown. The heads have a lower portion 31, which fits into the recess of each adapter in two different rotational positions, which are turned 180 degrees in relation to one another in the horizontal plane. The heads 27 can thus be releasably mountable at the adapters 24 in a finite number of selectable fixed orientations.

It shall be appreciated that the parts of the fixture devices: column, adapter and head can have different appearances, engagement and locking mechanism than the above shown as long as they comprise these three parts which are releasably attachable to one another and where at least one part can be mounted in several different positions in order to adjust the height of the mounted fixture devices.

FIGS. 4a-b show an example of an alternative embodiment of an adapter 24'. There are four different positions 41a-d in their upper portion, at which heads intended for this embodiment of adapter can be mounted. In each of the two first positions 41a-b a head is fastened between two clamping washers 42 on each side of respective position, which clamping washers 42 are mounted at the adapter 24' by means of screws 43. In each of the two latter positions 41c-d, a head is fastened by screws in screw holes 44 intended therefore.

A version of this adapter has a further clamping washer in the third position 41c, which clamping washer is fastened to the adapter by a screw. Hereby, four identical positions are created, at which heads can be mounted, where the positions are separated by 90 degrees from one another.

The columns 21 and the adapters 24 are preferably universal and can be used for all vehicles, which are to be repaired or inspected. The columns 21 can be provided in different heights. As an example a levelling bench may need 20-25 columns in for instance six different heights. The adapters 24 can also be provided in different heights or lengths, for instance a levelling bench may require about 20 adapters in three different heights. This set of columns 21 and adapters 24 can be used for a large number of vehicle models. The adapters can be provided in two versions, for instance in the version shown in FIG. 4 and in the version described above.

The heads 27 are tailored for a particular vehicle model so that when they are mounted they define certain specific reference points of the vehicle, which is to be repaired or inspected. Certainly similar heads 27 may be used for more than one model but typically the heads 27 are manufactured and marketed in a set, which is intended for a particular vehicle model. A set may consist of for instance about 20-30 heads. For such a set a data sheet is provided, which shows the columns and adapters, which shall be used with the heads, as well as where and how the columns, adapters, and heads shall be mounted for the vehicle model in question.

During repair details such as for instance deformed vehicle body parts, which are not positioned and oriented according to the specification indicated by the manufacturer of the vehicle, are straightened by means of an illustrated straightening device, thereby forming and orienting the body parts so that the reference points will coincidence with those indicated by the heads 27.

Typically, a repair shop does not have a complete set of heads for all the vehicle models occurring on the market—it will be far to expensive. In the normal case a shop has a few number of sets for the most common models or possibly no sets at all. They are instead ordered when required. Typically, they are rented during a limited time, during which the repair of the vehicle is performed. Thus, transportation of heads occurs to a considerable extent.

An advantage of the heads according to the present invention is that they are small and of light weight. A set of heads is neither bulky nor particularly heavy and can be transported simply and to a low cost—unlike the heads which are used according to the known art. The heads, which are disclosed in for instance U.S. Pat. No. 4,781,045, correspond to both the heads and the adapters according to the present invention and have thus also the function of adjusting the height of the fixture devices. Hereby they will be much more bulky and heavy.

The heads according to the invention are also simpler and cheaper to manufacture.

According to the present invention a set of adapters are used for all car models which are to be repaired or inspected and these have thus not to be ordered for each new car model which is to be handled.

A further advantage of the fixture device divided into three pieces according to the invention is that the columns and the adapters can be combined in more than one manner in order to reach a desired height of the fixture device. A column of medium height and an adapter of medium height reach a certain height, but the same height can be reached by a lower column and a higher adapter or by a higher column and a lower adapter. Hereby, a larger flexibility is reached and a less number of columns would be required for a certain number of vehicle models than what would be required by the solution according to the known art.

It shall further be appreciated that the levelling bench arrangement of the present invention can alternatively be arranged for variable or continuous adjustment. Thus, the beams can be lockable to the elongated support structure 3 at continuously adjustable positions, the fixture devices 7 can be mountable at the beams at continuously adjustable positions, the adapters 24 can be releasably mountable at the columns 21 in order to obtain mounted fixture devices of continuously adjustable heights, and/or the heads 27 can be releasably mountable at the adapters 24 in continuously adjustable rotations. In such instances different scales on the different parts would facilitate mounting and adjustment of the levelling bench arrangement.

With reference next to FIGS. 5-7, which show in perspective views the levelling bench arrangement of FIG. 1 at different stages of a method for alignment of columns, adapters, and heads in relation to a vehicle, this aspect of the present invention will be further described.

The method starts from an empty frame or levelling bench 1 which is shown in FIG. 5. The levelling bench 1 can be mounted on a scissor lift or other lifting device. A vehicle, which is to be repaired on inspected, is arranged (for instance by means of the lifting device and a number of holding devices) at a height above the levelling bench 1 which makes simple access possible for mounting of the levelling bench arrangement, after which the elongated support structure 3 is loosely arranged on the levelling bench 1. Note that neither the lifting device nor the vehicle, are shown in the figures. The elongated support structure 3 is arranged in a direction essentially parallel (y-direction) with a longitudinal direction (y-direction) of the vehicle.

Some of the beams 5 are then locked to the elongated support structure 3, at least in the horizontal plane (xy-plane), but possibly also in the vertical direction (z-direction). The number of beams 5 has to be at least two and can at maximum be equal to the number, which is to be used. Preferably two to three or two to four beams are used. The result is shown in FIG. 6.

Next fixture devices 7 are releasably mounted at the beams 5. The number of fixture devices 7, which are used for the alignment, shall preferably be at least two. Typically, four to six fixture devices are used. The result is shown in FIG. 7.

Certainly, the beams 5 shall be locked to the elongated support structure 3 and the fixture devices 7 should be mounted at the beams 5 at positions, which correspond to the model of the vehicle in question.

The vehicle is then lowered to the position it shall have during the repair or the inspection and the fixture devices 7 are aligned with respect to the vehicle by means of continuously moving the beams 5 and the elongated support structure 3 as a single unit in the horizontal plane and at least two of the beams 5 are releasably attached to the levelling bench 1, thereby locking the beams 5 and the elongated support structure 3 to the levelling bench 1. In the illustrated case there are only two beams and these are then attached to the levelling bench 1. Alternatively, instead of lowering the vehicle the levelling bench can be raised by means of the lifting device.

Note that the vertical movement of the vehicle relative to the levelling bench arrangement and the horizontal movement (alignment) of the beams 5 and the elongated support structure 3 as a single unit can be performed in stages with a finer and finer adjustment of the beams 5 and the elongated support structure 3 the closer the vehicle is relative to the levelling bench arrangement in the vertical direction.

Preferably, the beams 5 and the elongated support structure 3 are resting on the levelling bench 1 and they are moved as a single unit by means of pushing and/or drawing the single unit over the levelling bench 1 by a force which exceeds the friction force between the levelling bench 1/the beams 5 and the elongated support structure 3.

Hereby, neither the vehicle nor the levelling bench/lifting device have to be moved in the horizontal plane, but only a considerably lighter arrangement comprising a support structure, a few beams and some fixture devices have to be moved during alignment. The arrangement can hereby be said to be "floating" on top of the levelling bench/lifting device.

It shall further be noted that when the alignment is completed the vehicle may rest with part of its weight on at least some of the fixture devices 7. Possibly, also another one of the shown holding devices or fastening devices may be provided.

Next the method continues, with the vehicle in an unchanged position, by locking of any further beams which are required for the vehicle to the elongated support structure 3 and mounting of any further fixture devices 7 which are required for the vehicle to the beams 5. An aligned levelling bench with mounted fixtures similar to that of FIG. 1 is obtained.

It shall be appreciated that the above described alignment method can be used for other fixture devices than those being described with reference to FIGS. 2-4. For instance, the method can be used for fixture devices in two pieces, each comprising a column releasably mountable to a support and a head releasably mountable to the column, which is described in the above-mentioned U.S. Pat. No. 4,781,045. The method can also be used with fixture devices, each of which being made in one piece in accordance with older art.

It shall further be noted that the elongated support structure 3 and the beams 5 can be exchanged for a thicker support structure, frame structure or structure, wherein the fixture devices are mounted directly to this structure. Such structure can be in one piece or be assembled. If the above described alignment method is applied, it is the thicker support structure, frame structure, or structure, with at least a few fixture devices mounted thereon, that is moved in the horizontal plane above the levelling bench 1 during the alignment.

The present invention, being hereby described, is obviously not limited to the above-described embodiments, which are also shown on the drawings, but can be modified within the scope of appended patent claims.

The invention claimed is:

1. A method for alignment of a vehicle and a levelling bench arrangement in relation to one another, wherein the levelling bench arrangement comprises a levelling bench (1), a support structure (3), a plurality of beams (5), and a plurality of fixture devices (7), wherein said method is characterized by the steps of:

arranging said support structure on said levelling bench, wherein said support structure is elongated and is locked to said levelling bench in a direction essentially parallel (y) with a longitudinal direction (y) of said vehicle, locking said beams to said support structure at least in a horizontal plane at predetermined positions matching the model of the vehicle, wherein said beams includes at least a first beam, releasably mounting said fixture devices on said beams at predetermined positions matching the model of the vehicle, wherein said fixture devices include at least a first fixture device, arranging a vehicle, which is to be repaired or inspected, in a first position above said levelling bench, aligning said fixture devices with respect to said vehicle by means of continuously moving said beams and said support structure as a single unit with respect to said vehicle and said levelling bench in the horizontal plane so that the fixture devices will define certain specific reference points of the vehicle, and subsequent to aligning said fixture devices with respect to said vehicle, releasably fastening at least some of said beams or said support structure to said levelling bench, thereby locking said fixture devices to said levelling bench after having been aligned with respect to the vehicle.

2. The method of claim 1, wherein, said vehicle, which is to be repaired or inspected, is arranged in a second position above said levelling bench before said fixture devices are mounted at said beams, where said second position is higher than said first position, and said vehicle is arranged in said first position by means of lowering said vehicle.

3. The method of claim 1, wherein said beams subsequent to said first beam are locked to said support structure at least in the horizontal plane after said first beam or said support structure have/has been fastened to said levelling bench.

4. The method of claim 1, wherein said first fixture device is mounted on said first beam and a remainder of said further fixture devices are mounted on a remainder of said beams.

5. The method of claim 1, wherein said beams are locked to said elongated support structure perpendicular (x) to an extension (y) thereof.

6. The method of claim 1 wherein said beams are locked to said support structure at selected positions of a finite number of selectable positions along an extension of said support structure.

7. The method of claim 1, wherein said fixture devices are mounted at said beams at selected positions of a finite number of selectable positions (23) along an extension of said beams.

8. The method of claim 1, where each of said fixture devices comprises a column releasably mountable at said beams and a head releasably mountable at said column, wherein the step of mounting said fixture devices at said beams comprises the steps of mounting said column at said beams and mounting said heads at said columns.

9. The methods of claim 8, wherein said heads are mounted at said columns at a selected vertical position of a finite number of selectable vertical positions in order to obtain mounted fixture devices of a selected height of a finite number of selectable heights.

10. The method of claim 1, wherein each of said fixture devices comprises a column (21) releasably mountable at said beams, an adapter (24) releasably mountable at said column, and a head (27) releasably mountable at said adapter, wherein the step of mounting said fixture devices at said beams comprises the steps of mounting said columns at said beams, mounting said adapters at said columns, and mounting said heads at said adapters.

11. The method of claim 10, wherein said adapters are mounted at said columns at a selected vertical position of a finite number of selectable vertical positions in order to obtain mounted fixture devices of a selected height of a finite number of selectable heights.

12. The method of claim 10, wherein said heads are mounted at said adapters in selected orientations of a finite number of selectable orientations.

13. A method for alignment of a vehicle and a levelling bench arrangement in relation to one another, wherein said levelling bench arrangement comprises a levelling bench (1), a support structure (3), and a plurality of fixture devices (7), wherein said method is characterized by steps of:

arranging said support structure on said levelling bench, wherein said support structure is elongated and is locked to said levelling bench in a direction essentially parallel (y) with a longitudinal direction (y) of said vehicle, releasably mounting all of said fixture devices on said support structure, arranging a vehicle, which is to be repaired or inspected, in a first position above said levelling bench, aligning said fixture devices, with respect to said vehicle by moving said support structure in a horizontal plane so that all the fixture devices move with respect to both the vehicle and the levelling bench and will define certain specific reference points of the vehicle, and releasably fastening said support structure to said levelling bench, thereby locking said support structure to said levelling bench in an aligned position.

* * * * *